United States Patent [19]

Ghatak

[11] Patent Number: 4,850,339

[45] Date of Patent: Jul. 25, 1989

[54] SOLAR OVEN

[76] Inventor: Ranen N. Ghatak, 3425 Toquima, Las Vegas, Nev. 89120

[21] Appl. No.: 277,678

[22] Filed: Nov. 29, 1988

[51] Int. Cl.$^4$ .................................................. F24J 2/02
[52] U.S. Cl. .................................... 126/451; 126/438; 126/424
[58] Field of Search ............... 126/450, 451, 438, 424, 126/425, 432

[56] References Cited

U.S. PATENT DOCUMENTS

| | | | |
|---|---|---|---|
| 3,938,497 | 2/1976 | Andrassy | 126/451 |
| 4,236,508 | 12/1980 | Kerr | 126/451 |
| 4,292,957 | 10/1981 | Golder | 126/451 |
| 4,365,615 | 12/1982 | Melvin | 126/438 |
| 4,391,269 | 7/1983 | Watson | 126/438 |
| 4,446,854 | 5/1984 | Clevett et al. | 126/451 |

Primary Examiner—James C. Yeung
Attorney, Agent, or Firm—Owen, Wickersham & Erickson

[57] ABSTRACT

A solar oven. A rectangular cooking pan has a bottom and four side walls and is open at the upper end. It is in an exterior casing having a bottom and four side walls, and having an outer coating to lower the heat absorption. A body of insulation lies between the cooking pan and the exterior casing; the top edges of the body of insulation, the casing, and the cooking pan are coplanar to provide a rectangular shelf. A glass-supporting frame encloses and protects a sheet of low-iron, heat-conductive glass. A mirror-supporting frame has a solid top portion and sheet and supports a mirror combination, which comprises either a sheet of silvered glass or a sheet of polished aluminum, and a polyvinyl backing, so that the mirror combination has approximately 100% reflection on its lower side, below and opposite the top solid sheet. A support arm is pivoted to one side of the glass frame and has a series of openings therethrough. A mirror-support projection arm is secured to the mirror-supporting frame for engaging an opening through the support arm, for enabling the mirror-supporting frame to be supported at a plurality of different positions at various angles relative to the shelf and the glass sheet, said glass and its glass-supporting frame being unattached to the cooking pan, casing, and body for free manipulation by hand.

4 Claims, 4 Drawing Sheets

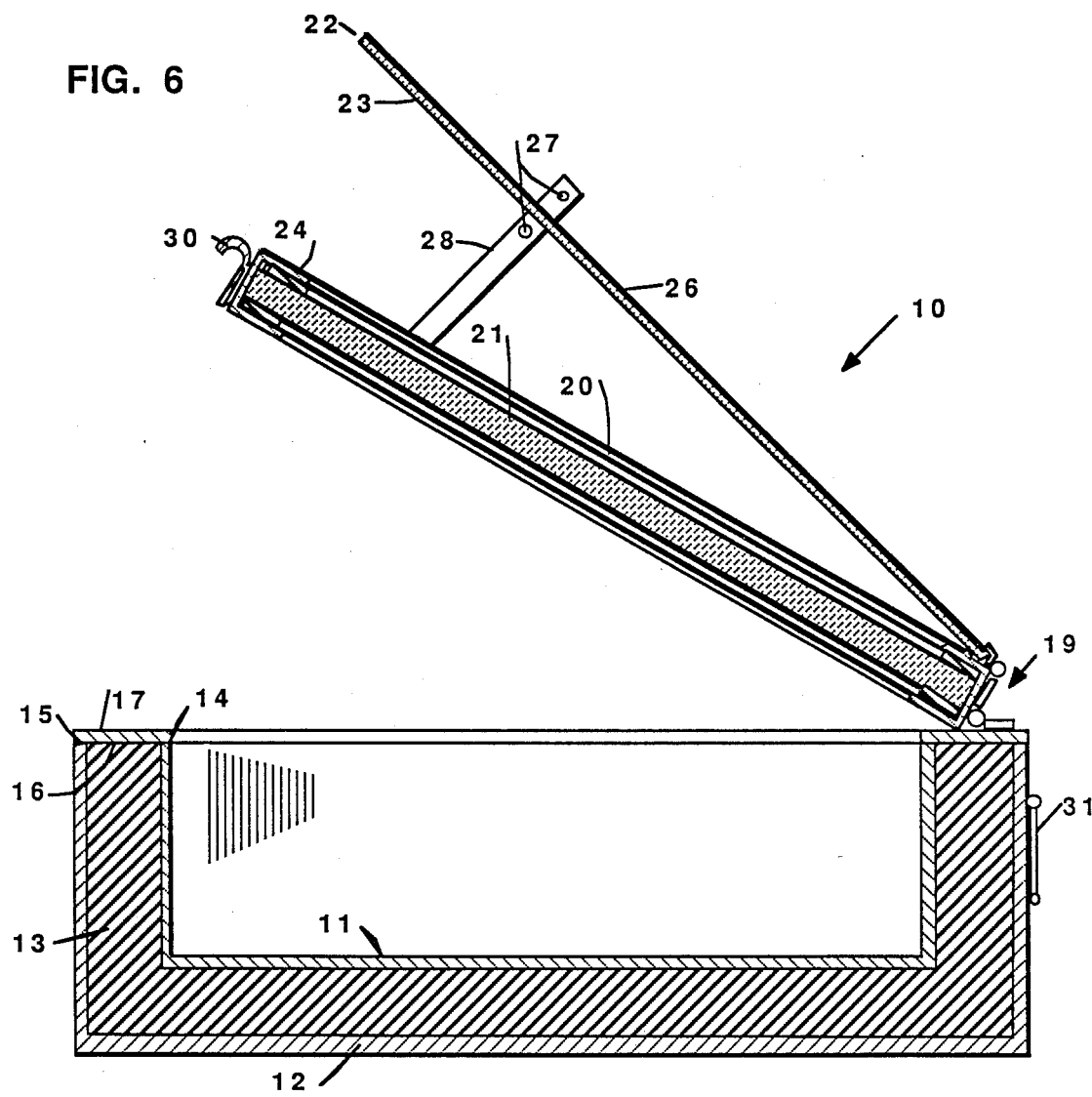

SOLAR OVEN

This invention relates to a solar oven, for flameless cooking of food.

BACKGROUND OF THE INVENTION

There are many places where flames are dangerous, and are either forbidden or discouraged. Also there are many parts of the world where firewood is far from plentiful, and where it is quite expensive to use wood for cooking fires.

SUMMARY OF THE INVENTION

The invention comprises a solar oven which may be, and usually is, portable, in which the sun's rays are introduced either directly, or by reflection from a special mirror combination, through a piece of high-transmittance glass into a thickly insulated chamber. The glass is retained in a frame and can be lifted or swung relatively to a housing member forming the insulated chamber; the swinging or lifting enables the introduction and removal of food. The mirror combination is hinged to the glass-retaining frame, and several positions or angles are possible. Special materials are used for the glass and the mirror combination in order to raise the oven temperature to about 300° F. in about 30 minutes. This temperature is suitable for boiling water for tea or coffee, and also for cooking vegetables and rice, and for cooking hot dogs and portions of meats.

BRIEF DESCRIPTION OF THE DRAWINGS

FIG. 6 is a view in side elevation and in section like FIG. 5 with the glass pane and the mirror combination each raised higher along their front edges.

DESCRIPTION OF THE PREFERRED DRAWING

Figure 1:
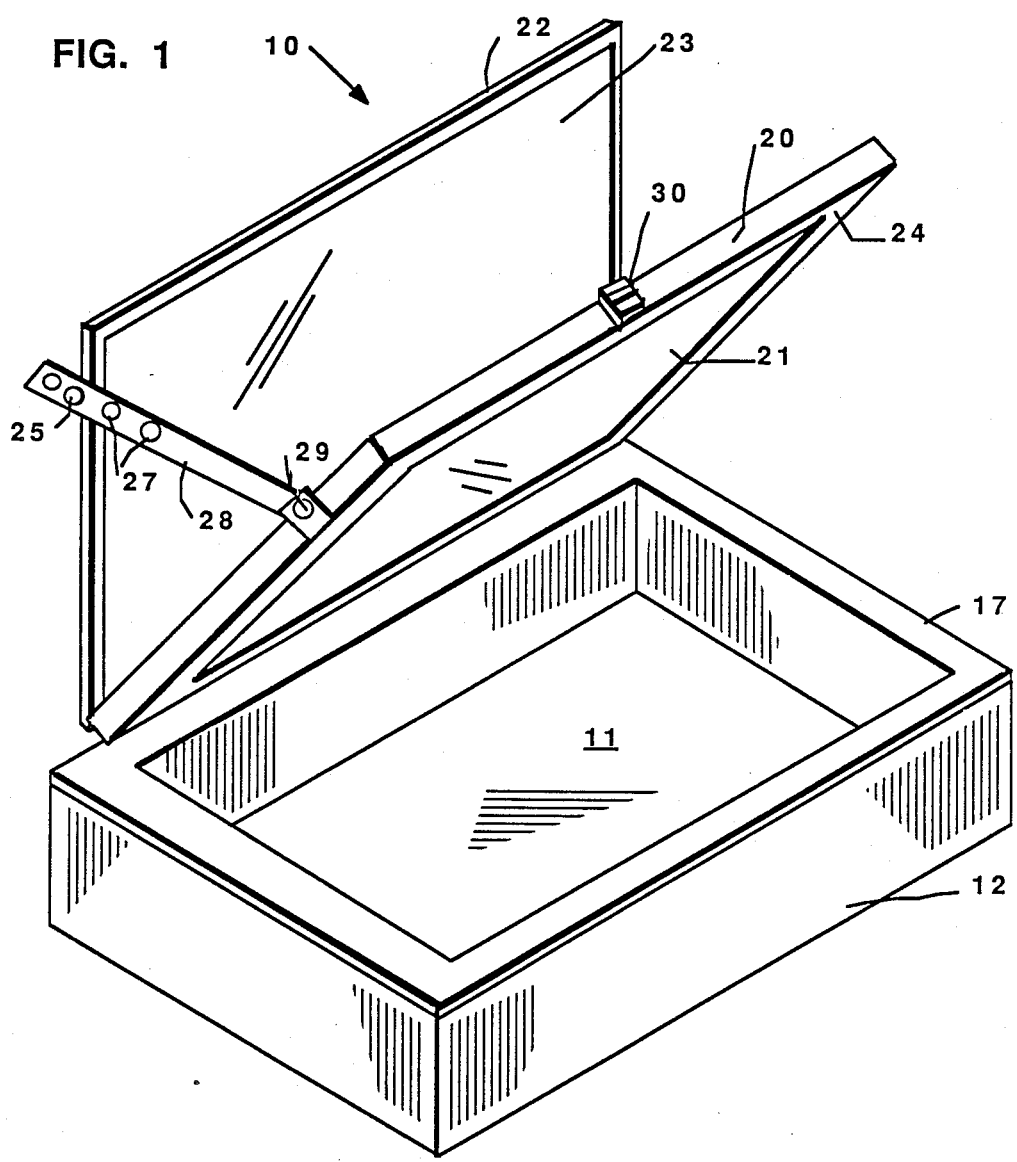
FIG. 1 is a view in perspective of the oven with a glass member in a frame swung or lifted along an edge to an appropriately elevated position for insertion of food into and removal of food from the oven, and with a mirror combination in a separate frame raised on its hinges further above the oven.
Figure 2:
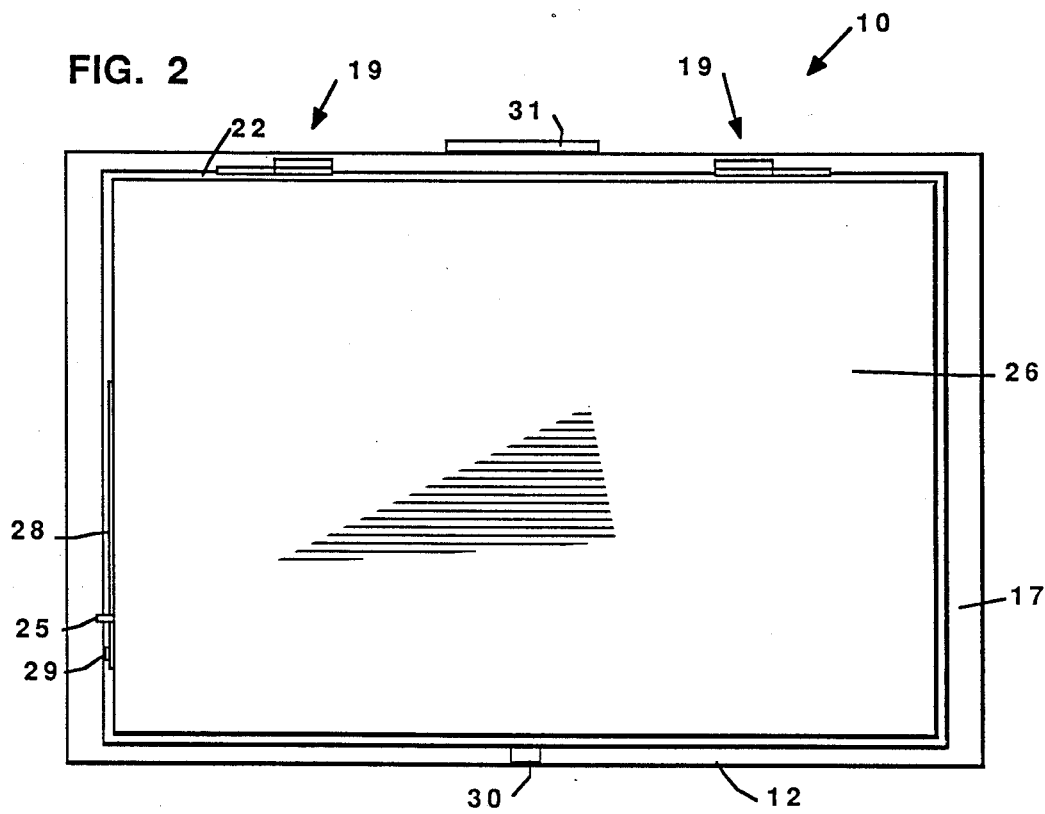
FIG. 2 is a top plan view of the oven, with the glass and mirror combination closed.
Figure 3:
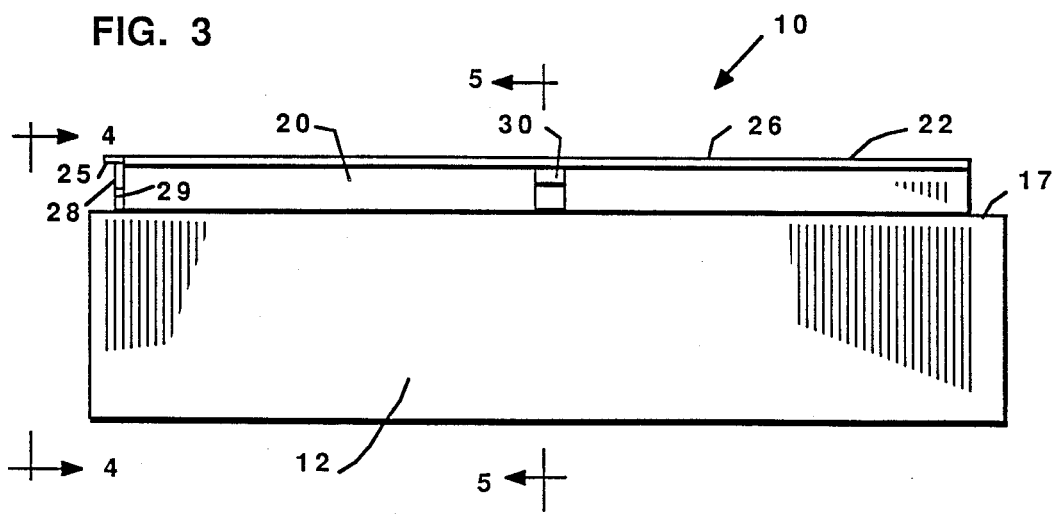
FIG. 3 is a view in front elevation of the oven, with the glass lowered to the cooking position, and with the mirror combination also lowered.
Figure 4:
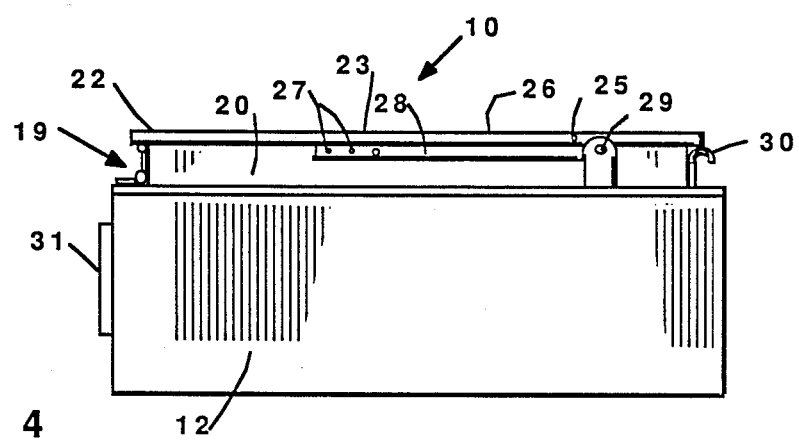
FIG. 4 is a similar view in side elevation of the oven taken along the line 4—4 in FIG. 3.
Figure 5:
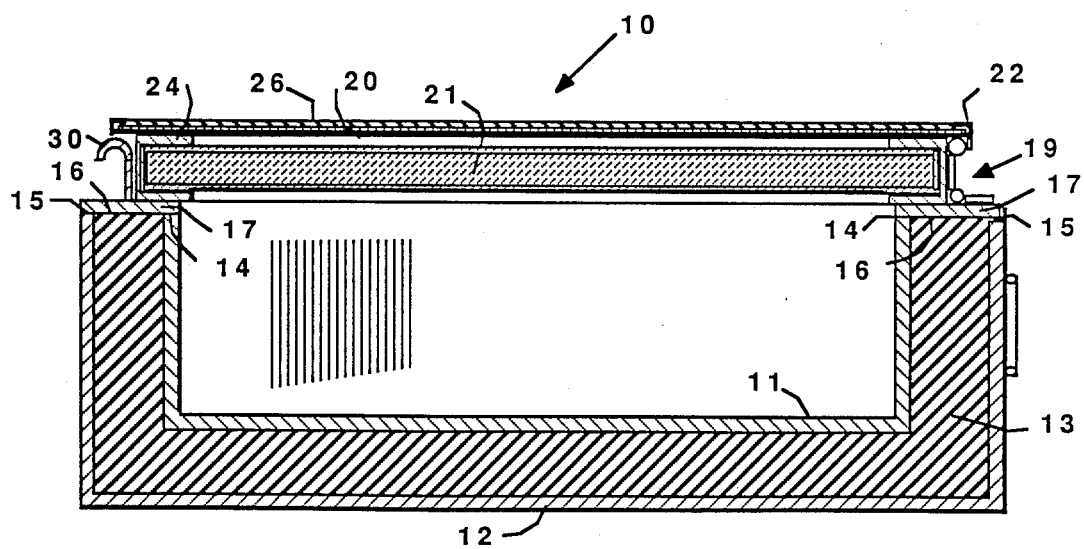
FIG. 5 is a view of the oven in section taken along the line 5—5 in FIG. 3.

An oven 10 of the invention includes an inner cooking pan 11 which is separated from an exterior casing 12 by thick insulation 13 (See FIGS. 5 and 6).

The inner cooking pan 11 may be an aluminum body with a black coating. It is about 4" deep, and preferably is of rectangular shape, although other shapes may be used if desired. The pan 11 is open on top to enable insertion, cooking, and removal of food members. The exterior casing 12 is a steel box with a powder coating thereon on its outer surface, to prevent absorption of heat on the outer surface. The insulation 13 (FIGS. 5 and 6) may be Styrofoam, or polyisocyanurate foam, which goes between the cooking pan 11 and the exterior casing 12, not only at the bottom but at all four sides. The upper edge 14 of the cooking pan 11, the upper edge 15 of the exterior casing 12, and the top 16 of the insulation 13, preferably are coplanar so that they form a very convenient shelf to support an upper wall 17 that is secured thereto.

Over the upper edges 14, 15, and 16 is a first frame 20 for a special glass pane 21.

Connected to the wall 17 is a rear aluminum hinge assembly 19 to which is attached, somewhat like a piano hinge, a second frame 22 for a mirror combination 23.

The frame 20 for the glass pane 21 is preferably aluminum and is basically an open rectangle providing a margin 24 which receives and firmly holds a sheet 21 of low-iron, high transmittance glass. The frame 20 protects the edges of the glass pane 21 and is secured to the glass sheet or pane 21. The low-iron glass pane 21 is very effective in letting the heat go through; it does not cut out the effective rays of heat coming in the sunlight. (The glass member 21 could be made of two sheets secured together by a Rhodor-Term silicon sealant, but it is better to use a single sheet of this special low-iron glass. Most glass has an iron content of about 0.12% iron; the pane 21 is made from glass having an iron content of only 0.04%. This glass gives transmittance of about 83% instead of the transmittance of about 77% for the 0.12% iron glass.)

The mirror frame 22 may be a steel or aluminum frame with a powder coating 26 on its outer (upper) surface to protect the mirror combination 23. Since the mirror combination 23 is not transparent and is heated during use, it appears as a solid sheet on the outside and faces inside. Thus, the frame member 22 secures and supports thereto the mirror combination 23, which preferably combines a silvered pane of glass on a sheet of polished aluminum and above it, an opaque sheet of suitable plastic with a upper or rear surface of polyvinylchloride. The mirror combination gives very nearly 100% reflection.

The hinges 19 may be aluminum, and there are at least two such hinges 19 for the frame 22. The glass pane 21 and its frame 20 are not attached to the oven members 11, 12, and 13, and it is swung up or lifted by hand. It is not hot. In addition, the mirror-support frame 22, which is preferably made from a flat plate of aluminum, is designed to support the mirror combination 23 in three different positions relative to the glass 21. It is therefore provided with a projection 25 which engages openings 27 through a support arm 28 at any of 60°, 90°, and 110° positions to get these positions at different angles. The support arm 28 is pivoted at 29 to the frame 20.

There is an aluminum hook 30 to open and close the cooking chamber.

There may also be a carrying handle 31 for the oven 10, which helps to make the oven portable. This handle 31 may be a steel member; so that the oven 10 may be carried easily.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A solar oven, including in combination
   a rectangular cooking pan with a bottom and four side walls, open at the upper end, an exterior casing having a bottom and four side walls, and having an outer coating to lower the heat absorption, a body of insulation in between said cooking pan and said exterior casing, the top edge of said insulation, casing, and cooking pan all being coplanar to provide a rectangular shelf, a glass-supporting frame enclosing and protecting a sheet of low-iron, heat-conductive glass, said glass having an iron content of only about 0.04% and a transmittance of heat about 83%, a mirror-supporting frame having a solid top portion and top sheet for supporting a mirror combination below said sheet, hinges connecting said mirror supporting frame to said casing, said mirror combination comprising a mirror and a polyvinyl backing with approximately 100% reflection on the lower side of said mirror combination below and opposite to said top solid portion of said mirror-supporting frame, and a support arm pivoted to the side of said glass frame and having a series of openings therethrough, and a mirror-support projection secured to said mirror-supporting frame for engaging one of said openings through said support arm for enabling said mirror to be supported at any of a plurality of positions at various angles relative to said shelf and said glass sheet, said glass and its glass-supporting frame being unattached to said cooking pan, casing, and body for free manipulation by hand.

2. The oven of claim 1 wherein said insulation is of polyisocyanurate foam.

3. The oven of claim 1 wherein said mirror combination combines a silvered glass mirror with said polyvinyl backing.

4. The oven of claim 1 wherein said mirror combination combines a sheet of polished aluminum with said polyvinyl backing.

* * * * *